Sept. 8, 1959  G. H. WEBER  2,903,329
DEVICE FOR MOLDING ANISOTROPIC PERMANENT MAGNETS
Filed April 13, 1954
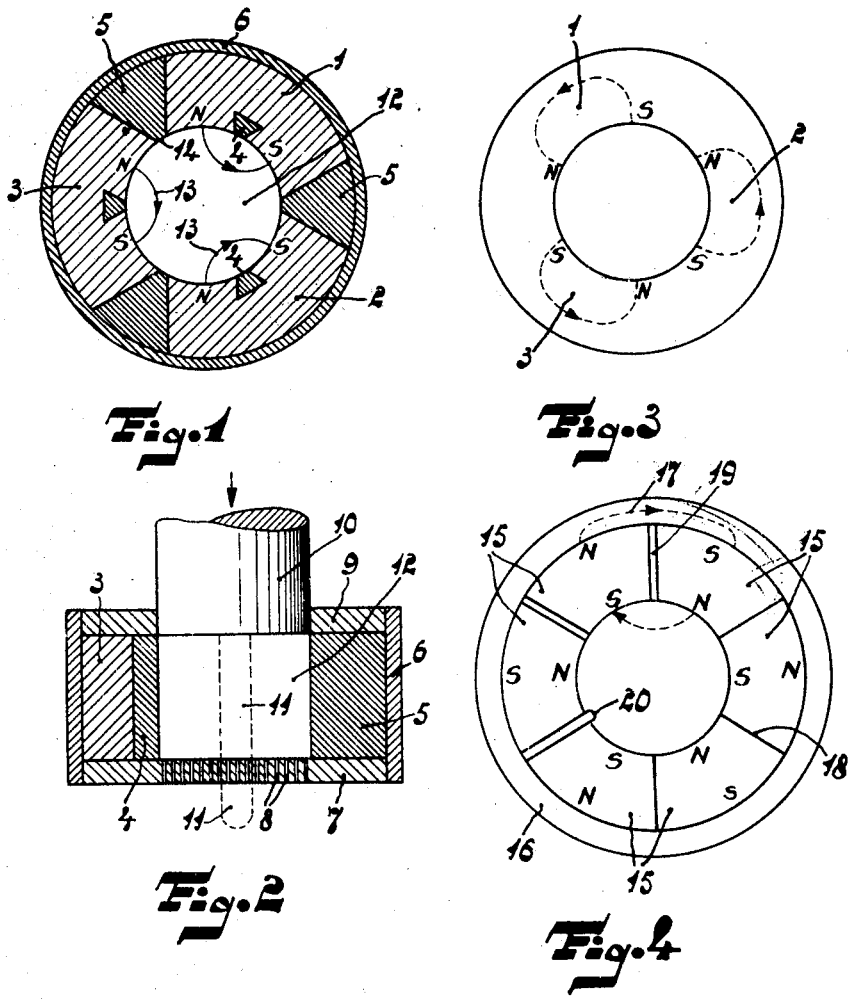
INVENTOR
GERARD HUGO WEBER
BY
AGENT United States Patent Office 2,903,329
Patented Sept. 8, 1959

2,903,329

DEVICE FOR MOLDING ANISOTROPIC PERMANENT MAGNETS

Gerard Hugo Weber, Eindhoven, Netherlands, assignor, by mesne assignments, to North American Philips Company, Inc., New York, N.Y., a corporation of Delaware Application April 13, 1954, Serial No. 422,864

Claims priority, application Netherlands April 11, 1953

4 Claims. (Cl. 18—47)

This invention relates to anisotropic permanent magnets, and to mold devices for making such magnets.

In accordance with the invention the anisotropic permanent magnet is circular with poles of alternate polarity distributed along a peripheral surface thereof, which magnet is composed of a material consisting substantially (i.e. in general at least 60 vol. %) of hexagonal crystals having dimensions less than 10 microns and the composition $MO \cdot 6Fe_2O_3$ or $MFe_{18}O_{27}$, where M represents any of the metals Ba, Pb or Sr. The term anisotropic is used to denote all phenomena which promote magnetization in a certain preferential direction. In a preferred embodiment, the principal directions of ultimate magnetization are developed between the poles of the magnet while molding said magnet from finely divided particles, followed by sintering the compacted particles. The ferromagnetic properties of the material of the resultant magnet are mainly determined by said hexagonal crystals.

Such a magnet is particularly suitable for use as an armature with radially extending poles for low power electrical apparatus, such as synchronous motors and bicycle dynamos. Since, in practice, demagnetization of the magnet does not occur, a constant power is ensured even after long use. Moreover such magnets are cheaper to manufacture than magnets made from known Ni—Al—Co—Fe-steels. The $(BH)_{max}$ value of said anisotropic magnets may be 2,300,000 and higher, for example 3,000,000.

The method of making the anisotropic permanent magnets is characterized in that the constituents are introduced in a finely divided state into a mold and subjected to the action of magnetic fields in order to develop principal directions between the poles, the material being compressed during said action. The compacted body is then removed from the mold and sintered at a temperature of about 900 to 1450° C., and, if necessary subsequently ground at the pole periphery.

During sintering, the shrinkage of the anisotropic material in the principal direction and at right angles thereto may be different (for example 21% and 16% respectively). Consequently an initially circular cylindrical molded magnet having, for example, six poles, may leave the sintering oven as a somewhat hexagonal magnet having six corners situated in the neutral zones. A circular magnet may thereafter be formed by grinding.

The invention will now be described in greater detail with reference to the accompanying drawing, in which:

Fig. 1 is a plan view of a mold in accordance with the invention;

Fig. 2 is a sectional elevational view of the mold shown in Fig. 1; and

Figs. 3 and 4 are modifications of the mold shown in Fig. 1.

With reference to Fig. 1, the mold contains three permanent magnets 1, 2 and 3 each having a N- and a S-pole. The material for these magnets has a remanence of at least 1500 gauss and a $_BH_C$ value of at least 1000 oersted. Such materials are, for example, the well-known Mn—Bi alloys; however, in a preferred embodiment of the invention, the magnet material of the mold may also consist at least substantially of hexagonal crystals having dimensions less than 10 microns and a composition corresponding to the formula $MO \cdot 6Fe_2O_3$ or $MFe_{18}O_{27}$, M being one or more of the metals Ba, Sr, Pb, and, if desired, Ca. The magnets are preferably anisotropic, as described in U.S. Patent No. 2,762,778. The mold further comprises filling pieces or inserts 4, 5 of non-ferromagnetic material and a surrounding wall 6. In the cross-sectional view of the mold shown in Fig. 2, a base 7 is provided with narrow filtering openings 8 and a cover 9. A non-ferromagnetic punch 10 may comprise a core 11, shown in broken lines, which passes through an aperture of the base 7, to provide an aperture for a shaft in the circular cylindrical magnet to be molded.

The pulverulent magnetic material in a liquid medium, as described in said U.S. patent, is introduced into a hollow chamber 12 of the mold. By lowering the punch or die 10, the liquid is then pressed out through the openings 8 which may be covered with filtering paper, thereby producing a molded six-polar magnet body with three principal directions as indicated by arrows 13 in Fig. 1. The molded magnet may be furnished with a mark to indicate the area of a neutral zone (for example, 14 in Fig. 1) so that the poles of the principal directions may be accurately provided opposite the poles of the ultimate magnetizing device after sintering and possible grinding of the magnet.

In the modification of Fig. 3, the three magnets 1, 2 and 3 of the mold are made in one piece and magnetized as indicated in broken lines, thus eliminating the inserts 4, 5 used in the Fig. 1 embodiment.

In the modification of Fig. 4, separate elongated sector-shaped magnets 15 are provided at the inner periphery of the mold and surrounded by a yoke 16 consisting, for example, of soft iron for closing the lines of force (broken line 17). The magnets may either be provided to adjoin each other, as shown at 18, since demagnetization does not practically occur, or may be separated from each other by insert pieces 19 of non-magnetic material. If the insert pieces are shaped as indicated at 20, the poles of the ultimate molded magnet are pronounced to a greater or lesser degree. These molds may also comprise a base 7 and a cover 9 as shown in Fig. 2.

In order to compensate for the uneven shrinkage of the maget on sintering, the inner periphery of the mold may be slightly angular resulting in the formation of circular magnets. Similarly, the shape of the internal pin denoted by 11 in Fig. 2 may be slightly angular to form a circular aperture for a shaft.

While I have described my invention in connection with specific embodiments and applications, other modifications thereof will be readily apparent to those skilled in this art without departing from the spirit and scope of the invention as defined in the appended claims.

What is claimed is:

1. A mold for making a circular anisotropic permanent magnet, comprising a hollow cylindrical body of ferromagnetic material having poles of alternate polarity disposed around the inner surface thereof and being constituted of portions that are magnetically anisotropic, said material consisting substantially of crystals having dimensions not exceeding 10 microns and having a composition selected from the group consisting of $MO \cdot 6Fe_2O_3$ and $MFe_{18}O_{27}$, M being a metal selected from the group consisting of barium, strontium, and lead, said body having a coercive force of at least 1000 oersted and a remanence of at least 1500 gauss, and a non-ferromagnetic punch axially movable within said ferromagnetic body.

2. A mold for making a circular anisotropic permanent magnet, comprising a hollow cylindrical body constituted of a plurality of elongated sector-shaped ferromagnetic members, said body having poles of alternate polarity disposed around the inner surface thereof and being constituted of portions that are magnetically anisotropic, and a yoke of soft magnetic material disposed around the outer surface of said members, the material of said ferromagnetic material consisting substantially of crystals having a size not exceeding 10 microns and having a composition selected from the group consisting of $MO \cdot 6Fe_2O_3$ and $MFe_{18}O_{27}$, M being a metal selected from the group consisting of barium, strontium, and lead, said members having a coercive force of at least 1000 oersted and a remanence of at least 1500 gauss, and a non-ferromagnetic punch axially movable within said hollow body.

3. A mold as claimed in claim 2 in which said mold includes a base having filter openings.

4. A mold adapted for making a substantially cylindrical anisotropic permanent magnet, comprising a hollow member containing permanent magnet material surrounding a substantially cylindrical opening having a central axis, said permanent magnet material being magnetized to produce poles of alternate polarity arranged in a circle on the surface of the member bounding the opening and coaxial with the opening, said permanent magnet material having a coercive force of at least 1000 oersted and a remanence of at least 1500 gauss, and a non-ferromagnetic punch movable along the axis of the opening and toward said opening.

References Cited in the file of this patent

UNITED STATES PATENTS

| 1,991,143 | Ehlers | Feb. 12, 1935 |
| 1,997,193 | Kato et al. | Apr. 9, 1935 |
| 2,576,679 | Guillaud | Nov. 27, 1951 |
| 2,619,674 | Stem | Dec. 2, 1952 |

FOREIGN PATENTS

| 523,970 | Great Britain | July 26, 1940 |
| 1,020,742 | France | Feb. 10, 1953 |

OTHER REFERENCES

Indiana Permanent Magnet Manual No. 4, The Indiana Steel Products Company, pages 14–16; received Mar. 17, 1950.

UNITED STATES PATENT OFFICE

CERTIFICATE OF CORRECTION

Patent No. 2,903,329                                                            September 8, 1959

Gerard Hugo Weber

It is hereby certified that error appears in the printed specification of the above numbered patent requiring correction and that the said Letters Patent should read as corrected below.

Column 2, line 48, for "maget" read -- magnet --; column 3, line 9, for "netic material consisting substantially of crystals having" read -- netic members consisting substantially of hexagonal crystals having --.

Signed and sealed this 1st day of March 1960.

(SEAL)
Attest:

KARL H. AXLINE                                                        ROBERT C. WATSON

Attesting Officer                                                Commissioner of Patents